Jan. 3, 1956    T. J. DUNN ET AL    2,729,044
POWER MOWER ATTACHMENT
Filed April 27, 1954    3 Sheets-Sheet 1

INVENTOR.
THOMAS J. DUNN
HERBERT W. DAVIS
BY
McMorrow, Berman & Davidson
ATTORNEYS Jan. 3, 1956 T. J. DUNN ET AL 2,729,044
POWER MOWER ATTACHMENT
Filed April 27, 1954 3 Sheets-Sheet 2
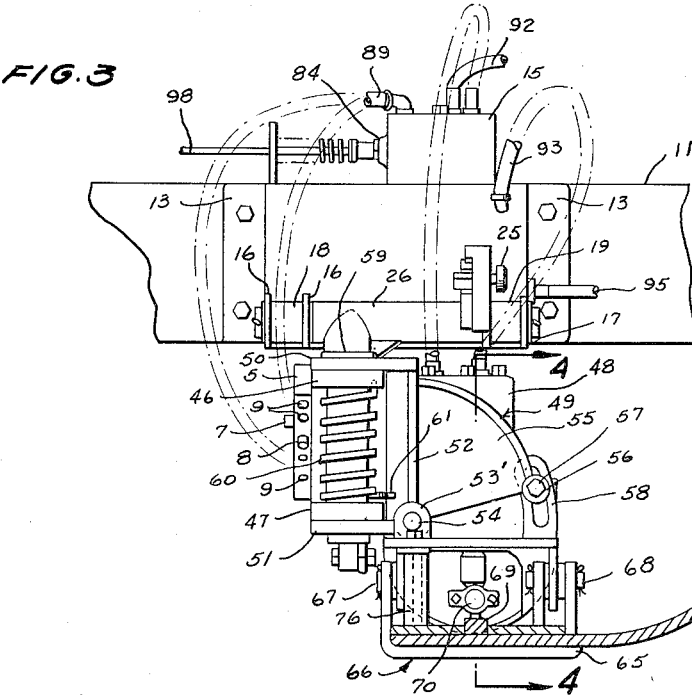
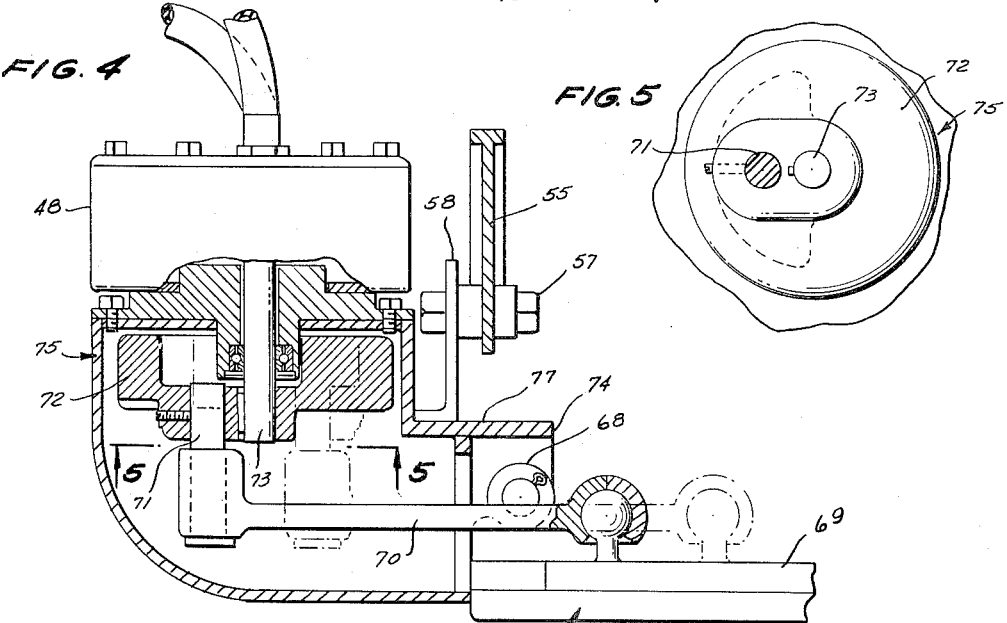
INVENTOR.
THOMAS J. DUNN
HERBERT W. DAVIS
BY
McMorrow, Berman + Davidson
ATTORNEYS Jan. 3, 1956 T. J. DUNN ET AL 2,729,044
POWER MOWER ATTACHMENT
Filed April 27, 1954 3 Sheets-Sheet 3
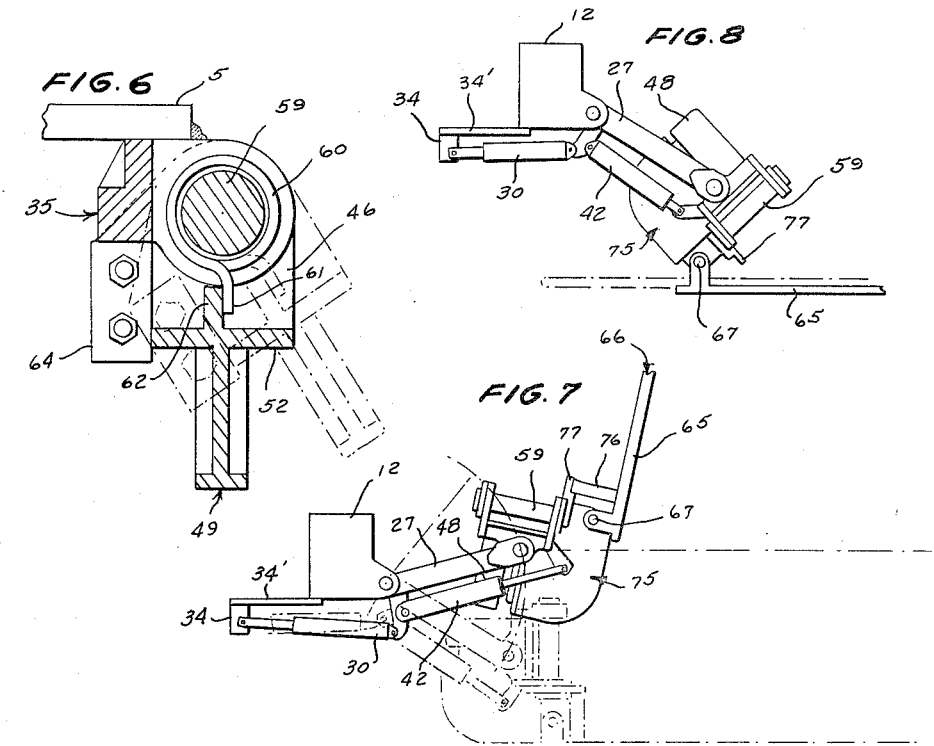
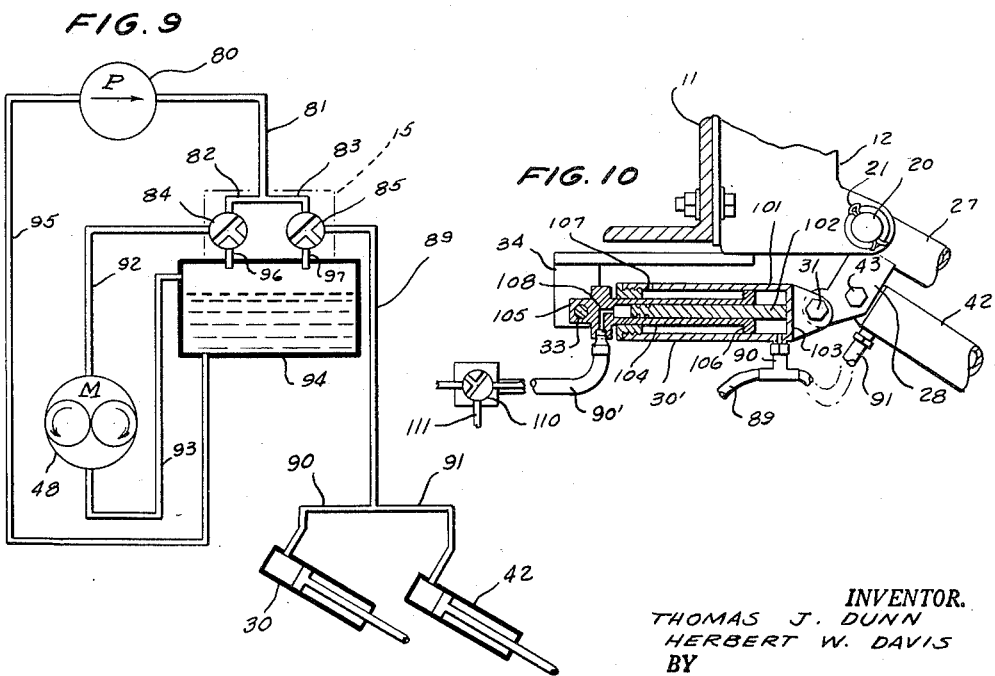
INVENTOR.
THOMAS J. DUNN
HERBERT W. DAVIS
BY
McMorrow, Berman + Davidson
ATTORNEYS United States Patent Office 2,729,044
Patented Jan. 3, 1956

2,729,044

POWER MOWER ATTACHMENT

Thomas J. Dunn and Herbert W. Davis,
Hackettstown, N. J.

Application April 27, 1954, Serial No. 425,848

10 Claims. (Cl. 56—25)

This invention relates to a power mower attachment, and more particularly to such attachment having a fluid pressure operated mower assembly of the reciprocating blade type.

A main object of the invention is to provide a power mower attachment of the fluid pressure operated type which is simple in construction, compact in size, easy to install, and provided with means for raising the reciprocating blade assembly thereof to an inoperative position.

A further object of the invention is to provide a power mower attachment of the type provided with a reciprocating blade mower assembly and with a hydraulic motor for operating the assembly, the attachment involving relatively inexpensive components, being rugged in construction, and being easy to maintain in operating condition.

A still further object of the invention is to provide a power mower attachment of the hydraulically operated type, said attachment being provided with an articulated suspension for the reciprocating blade assembly thereof, said suspension being arranged so that the reciprocating blade assembly may be quickly and easily elevated from a normal working position to an inoperative position, the attachment also being provided with means selectively limiting the downwardly direction movement of the reciprocating blade assembly.

A still further object of the invention is to provide a power mower attachment of the type having a hydraulic motor drivingly connected to a reciprocatory blade assembly, the attachment including means for rapidly and easily elevating the reciprocatory blade assembly and the subframe supporting same to an inoperative position, the reciprocating blade assembly being held normally in an outwardly extending position, but being yieldable when engaging obstacles, thereby preventing damage thereto, means for adjusting the position of the reciprocating blade assembly being provided on the attachment, and the attachment being arranged so that the moving parts thereof may be easily replaced, whenever necessary.

Further objects and advantages of the invention will become apparent from the following description and claims, and from the accompanying drawings, wherein:

Figure 3 is a vertical cross sectional view taken on the line 3—3 of Figure 1.

Figure 4 is an enlarged fragmentary cross sectional view taken on the line 4—4 of Figure 3.

Figure 5 is a cross sectional detail view taken on the line 5—5 of Figure 4.

Figure 6 is an enlarged cross sectional detail view taken on the line 6—6 of Figure 1.

Figure 7 is a fragmentary side elevational view, on a reduced scale of the attachment of Figures 1 to 6, the full lines indicating the reciprocating blade assembly raised to an elevated position and the dotted lines indicating such assembly in its normal operating position.

Figure 8 is a side elevational view, on a reduced scale of the assembly of Figure 7, but showing the stationary shear member of the reciprocating blade assembly lowered relative to the frame supporting frame, said frame being elevated, whereby the reciprocating blade may be removed, if necessary.

Figure 9 is a schematic diagram illustrating the fluid pressure connections of the hydraulic system employed with the mower attachment illustrated in Figures 1 to 8.

Figure 10 is a fragmentary view similar to Figure 1 showing a modified form of the attachment consructed in accordance with the present invention with parts broken away and shown in section.

Figure 1:
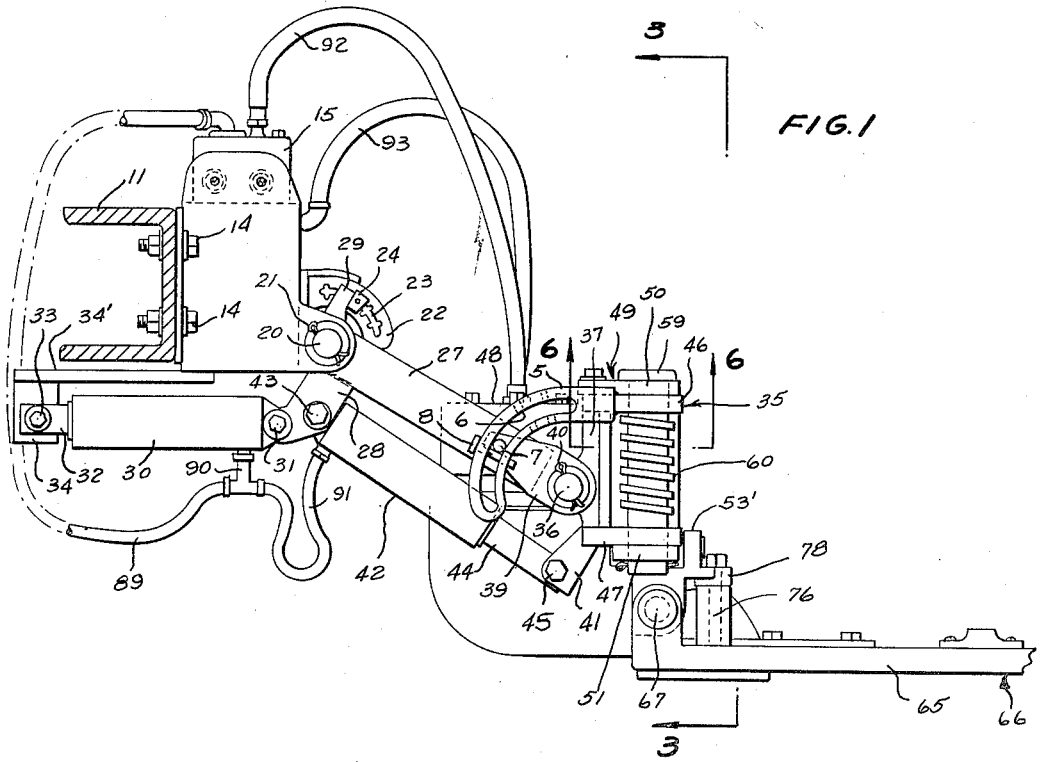
Figure 1 is a fragmentary elevational view, with parts broken away and shown in section of the frame of a vehicle to which is secured a power mower attachment according to the present invention.

Referring to the drawings, and more particularly to Figures 1 to 9, 11 designates a portion of the frame of a vehicle, such as a tractor or the like, the member 11 being, for example, a side or frame bar of the tractor frame. Designated at 12 is an upstanding housing adapted to be secured in side by side relation with respect to the side or frame bar 11 of the tractor frame, the side of the housing 12 for attachment to the tractor frame side having flanges 13, Figure 2, projecting therefrom which are secured to the side bar 11 by means of bolts 14 extending through the flanges and the side bar. Mounted on the top of the housing is a control valve 15, presently to be described.

An arm 27 is arranged on the side of the housing 12 remote from the flanges 13 adjacent the lower end of the housing and slopes downwardly and outwardly from the housing lower end, the upper end of the arm 27 being connected to the lower end portion of the housing for swinging movement about a horizontal axis in upwardly and downwardly directions. Also projecting from said lower end portion of the housing are two pair of spaced, vertically disposed lugs 16 and 17 to which are rigidly secured the respective horizontal axially aligned bearing sleeve elements 18 and 19 through which extends the transverse shaft or horizontal axis 20.

The shaft 20 is retained in the sleeves 18 and 19 by any suitable means, for example, by cotter pins 21 engaged through the ends of the shaft member.

Rigidly secured to the housing 12 adjacent the bearing sleeve 19 and projecting radially with respect to the axis or shaft 20 is a stationary sector plate 22 formed with the slot 23 arranged arcuately and concentric with the axis or shaft 20 of the sleeves 18 and 19, an adjustable stop member 24 being secured to the plate 22 by a screw 25 extending through the slot 23 and threadedly engaged with the stop member 24.

Journaled on the horizontal axis or shaft 20 and extending between the adjacent lugs 16 and 17 is a sleeve 26. The arm 27 has its upper end secured to the sleeve 26, and adjacent the upper end of the arm 27 is a depending second arm 28 which extends substantially perpendicular to the first arm 27, as shown in Figure 1. Rigidly secured to the sleeve member 26 is the upwardly projecting stop lug 29 which is engageable with the stop member 24, the stop lug 29 and stop member 24 constituting the stop means, which is operatively connected to the arm 27 for limiting the extent of the downwardly direction movement of the arm 27, as viewed in Figure 1. As above explained, the position of the stop member 24 may be adjusted along the arcuate slot 23, to vary the limiting position of the stop member 24 and to thereby vary the extent of the downwardly direction movement of the arm 27.

A first fluid pressure means or first fluid cylinder 30 is operatively connected to the arm 27 adjacent its upper end for effecting the swinging movements of such arm. The cylinder 30 which is horizontally disposed below and spaced from the bottom or lower end of the housing 12 has one end connected to the free end of the depending second arm 28 for pivotal movement about a transverse pin 31. The cylinder is provided with a piston 32 whose end is pivotally connected at 33 to a depending lug 34 rigidly secured to a horizontal bracket plate 34'. The bracket plate 34' is rigidly secured to the bottom of the housing 12, as shown in Figure 1.

As will be apparent from Figure 1, when the cylinder 30 is supplied with fluid under pressure, the piston 32 is extended from the cylinder, causing the arm 28 to be rotated counterclockwise, as viewed in Figure 1, around the shaft member 20.

An upstanding U-shaped frame 35 is positioned adjacent the lower end of the arm 27 and is connected intermediate its ends to the lower end of the arm 27 for swinging movement about a second horizontal axis parallel to and spaced from the first axis or shaft 20 in upwardly and downwardly directions. The frame 35 is so arranged that its legs 46 and 47 face away from the arm 27. The bight 37 of the frame 35 is provided with a bearing 38 intermediate its ends, the bearing 38 being connected to the free end of the arm 27 for movement about the second horizontal axis or stub shaft 36 in upwardly and downwardly directions. The stub shaft 36 extends transversely through apertured bearing lugs 39 carried by the free end of the arm 27. The shaft 36 is retained on the lugs 39 by means of cotter pins 40 extending through the end portions.

Rigidly secured to the leg 47 of the frame 35 is a downwardly and inwardly inclined lug 41. A second fluid pressure means or second fluid cylinder 42 is operatively connected to the frame 35 adjacent the lower end thereof for effecting the swinging movements of the frame, one end of the cylinder being pivotally connected at 43 to the intermediate portion of the depending arm 28. The cylinder 42 is provided with the piston 44 which is pivotally connected at its end to lug 41, as shown at 45. As will be readily apparent from Figure 1, when hydraulic fluid under pressure is admitted into the cylinder 42, the piston 44 is extended from the cylinder, causing the frame 35 to be rotated in the upwardly direction about the pivot shaft 36, as viewed in Figure 1.

Figure 2:
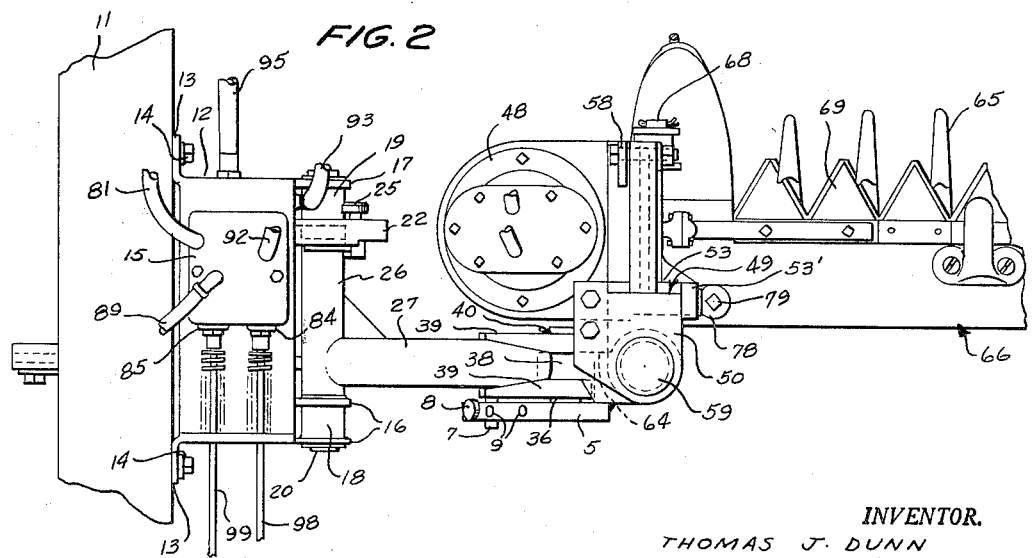
Figure 2 is a top view of the structure shown in Figure 1.

A stop means is also operatively connected to the frame 35 for limiting the extent of the downwardly direction movement of the frame. Such means, as shown in Figures 1, 2 and 3, embodies a stationary sector member 5 provided with a slot 6, the member 5 being carried by the leg 46 of the frame 35. Rigidly secured to the arm 27 is the rearwardly projecting finger 7 which is engageable with a stop pin 8. The pin 8 may be selectively positioned within the sector member 5 by insertion into any one of the holes 9 formed therein.

An upstanding U-shaped bracket 49 is arranged at a right angle with respect to the frame 35 and is connected to the frame 35 for rotational movement about a vertical axis in clockwise and counterclockwise directions. The bracket 49 is arranged so that its bight 52 is at a right angle with respect to the bight 37 of the frame 35 with its legs 50 and 51 engaged respectively above and below the legs 46 and 47 of the frame 35. On the leg 51 of the bracket 49 there is a horizontally disposed bearing 53 through which extends a pivot bolt 54, the pivot bolt 54 also extending through a complemental bearing 53' on an upstanding transmission casing 75, thus pivotally connecting the bracket 49 to the motor so that the motor may be rotated relative to the bracket around a third horizontal axis or pivot bolt 54. The bracket 49 is formed with the outwardly projecting sector shaped flange 55 extending in a plane normal to the axis of the pivot bolt 54, the end of said flange being formed with a sleeve 56 parallel to the hinge sleeve 53, through which extends a clamping bolt 57 which passes through an upstanding arcuately shaped slotted lug 58 carried by the transmission casing 75 and extending parallel to the vertical wall of the motor, as viewed in Figures 2 and 3.

Designated at 59 is the vertical axis or pivot bolt which extends through the legs 50, 46 and 47, 51, thus pivotally connecting the frame 35 to the bracket member 49, whereby said bracket member 49 is rotatable around the vertical axis of the pivot bolt 59 in clockwise and counterclockwise directions. A coiled spring 60 surrounds the pivot bolt 59 between the legs 46 and 47, the top end of the spring being secured to the leg 46 and the lower end of the spring, shown at 61, bearing against a vertical rib 62 formed on the bight 52, as shown in Figure 6, biasing the bracket 49, and the motor 48, secured thereto, counterclockwise, as viewed in Figure 6, but allowing the bracket 49 and the motor 48 to be rotated clockwise relative to the pivot member 59, as viewed in Figure 6, as shown in dotted view.

The upstanding transmission casing 75 is arranged on the foreward side of the arm 27 and extends transversely of the bracket 49, the casing being connected to the lower end of the bracket 49 for movement with the latter. A vertically disposed hydraulic motor, for example, a gear motor, is supported on the top of the casing 75.

An abutment member or block 64 is secured to the under side of the leg 50 which is engageable with the leg 46 of frame 35 to limit counterclockwise rotation of the motor 48 and bracket 49, as viewed in Figure 2, relative to the frame 35 and arm 27. However, when the mower assembly encounters an obstacle, the abutment member or block 64 is swingable with the bracket 49 and motor 48, as above explained, against the tension of the spring 60, allowing the mower assembly to be rotated clockwise, as viewed in Figure 2, until the obstacle is passed.

Designated at 65 is the stationary shear element of a reciprocating blade mower assembly 66, the shear element 65 being pivotally connected at 67 and 68 to the lower outer portion of the transmission casing 75. As shown in Figure 3, the pivot connections 67 and 68 are in alignment and define a hinged connection for the mower assembly 66 on an axis substantially parallel to the respective axes of the shaft 20 and the shaft 36. Designated at 69 is the reciprocating mower blade which is slidably mounted on the shear element 65 in the conventional manner for shearing cooperation therewith. The reciprocating blade 69 is connected by a pitman arm 70 to a depending vertical crankshaft 71 secured to a crank disc 72. The crank disc 72 is secured to the depending drive shaft 73 of the hydraulic motor 48, as shown in Figure 4. The pitman arm 70 extends through a horizontal sleeve element 74 formed on the lower portion of the casing 75, as shown in Figure 4, and normally the end of the mower assembly 66 engages the bottom wall of the casing 75, upward rotation of the mower assembly 66 being prevented by its engagement with a depending stop sleeve 76. The top wall of the sleeve 74, shown at 77, is formed with the apertured lug 78 to which the depending stop sleeve 76 is secured, as by a bolt 79 engaged through the apertured lug 78 and threadedly engaged in a central axial bore formed in the sleeve 76.

Thus, normally, the stop sleeve 76 prevents the mower assembly 66 from being elevated and retains said shear member in a substantially horizontal position. However, when it is desired to remove the blade 69, for example, for the purpose of substituting a new blade, the stop sleeve 76 may be removed, to allow the motor 48 and the parts associated therewith to be angled in the manner illustrated in Figure 8, and to allow the shear element 65 to be rotated upwardly with respect to flange 77, providing the required clearance for removing the reciprocating blade 69. Of course, the pitman arm 70 must first be disconnected from the blade 69 in order to allow the blade to be removed from the shear element 65.

Referring now to Figure 9, the vehicle is provided with a suitable pump 80 whose outlet port is connected by a conduit 81 to respective branch conduits 82 and 83 which are in turn connected through respective valves 84 and 85 to the hydraulic motor 48 and to a fluid pressure line 89. The fluid pressure line 89 is connected to respective branch conduits 90 and 91 connected to the end portions of respective fluid pressure cylinders 30 and 42. As shown in Figure 9, the valve 84 is connected to the motor 48 by a conduit 92, and the return conduit 93 of the motor is connected to a body of fluid 94 contained in the housing 12. The fluid body 94 is connected by a conduit 95 to the low pressure side of the pump 80.

The valves 84 and 85 are conventional two-way valves and have ports 96 and 97, respectively, leading to the fluid reservoir 94. The valve 84 is provided with the flexible operating shaft or cable 98, and the valve 85 is provided with the flexible operating shaft or cable 99, the valves being incorporated in the valve unit 15 above mentioned, which is mounted on the frame member 12. The flexible valve operating shafts 98 and 99 are operated from the vehicle by the provision of suitable operating knobs or handles mounted in a convenient location on said vehicle.

By means of the flexible cable 98, the valve 84 may be operated to connect the conduit 82 to the conduit 92 and to simultaneously seal off the port 96 of said valve, whereby hydraulic fluid under pressure is supplied to the hydraulic motor 48 through conduit 81, conduit 82, valve 84, and conduit 92. This causes the motor 48 to operate and to reciprocate the blade 69. At other times, the valve 84 may be operated to connect conduit 82 directly to port 96, whereby the hydraulic fluid under pressure is delivered directly to the reservoir 94.

Similarly, the valve 85 may be operated by means of the cable 99 to connect conduit 83 to conduit 89 and to seal off the port 97 of valve 85, whereby hydraulic fluid is delivered to the cylinders 30 and 32 by conduit 81, conduit 83, valve 85, conduit 89, and conduits 90 and 91. This causes the pistons 32 and 44 to be extended from the cylinders 30 and 42, whereby the mower assembly and the motor 48 are elevated in the manner illustrated in Figure 7 by the articulated linkage defined by cylinder 30, arm 28, arm 27 and cylinder 42. The parts may be locked in the position shown in Figure 7 by rotating the flexible shaft 99 to seal off the respective conduits 83, 89 and 97, as shown in Figure 9. When it is desired to lower the mower assembly and the motor 48, the flexible shaft 99 is rotated to bring the conduits 83, 89 and 97 respectively into registry with the ends of the T-shaped passage in the rotor of the valve 85, whereby the hydraulic fluid in the cylinders 30 and 42 is allowed to discharge into the fluid body 94 and the mower assembly and parts associated therewith are allowed to descend by gravity.

In the form of the invention illustrated in Figures 1 to 9, and above described, the lowermost position of the arm 27 is defined by the setting of the stop element 24, as above described. Figure 10 illustrates an alternative method of limiting the lowermost position of the arm 27 and the parts connected thereto, employing a double acting hydraulic cylinder 30' in place of the cylinder 30 of Figures 1 to 9.

As shown in Figure 10, the cylinder 30' comprises a main cylinder casing 101 having an end wall 103 and being pivotally connected at 31 to the end of the arm 28. Designated at 104 is a sleeve like piston member having an annular piston element 106 engaging the inside surface of the casing 101, the piston element 104 having the end member 105 which is pivotally connected at 33 to the depending frame lug 34. An axially arranged piston element 102 is slidably mounted in the sleeve like piston 104, as shown. The member 105 is provided with a passage 108 communicating with the space in the sleeve like piston 104 adjacent the end of the sliding axial piston member 102, the passage 108 being connected to a conduit 90' which leads to the pump through a manually controlled valve 110, said valve being provided with the discharge port 111 connected to the fluid body 94. The end of the casing 101 adjacent the wall 103 is connected to the fluid pressure line 90, as shown, the line 89 being similar to that illustrated in Figure 9 and described above.

To establish a predetermined limiting lower position of the arm 27, the valve 110 may be operated to admit a predetermined amount of fluid under pressure into the space in the sleeve like piston element 104 adjacent the end of the sliding piston 102 to elevate the mower assembly to the predetermined lowermost limiting position thereof. The valve 110 may then be operated to its locked position, sealing the respective ports of valve 110, and thus sealing the fluid in the end of the sleeve like piston 104. The piston element 102 thus defines a stop which limits the movement of the casing 101 to the left relative to the annular piston element 106, as viewed in Figure 10, thus providing a stop means for limiting the extent of downwardly direction movement of the arm 27 and the mower assembly connected thereto.

As shown in Figure 10, the casing 101 is provided with a vent opening 107 located at the end portion thereof opposite its end wall 103.

While certain specific embodiments of an improved mowing machine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A power mower attachment comprising an upstanding housing adapted to be secured in side by side relation with respect to a side of a tractor frame, an arm arranged on the side of said housing remote from the side adapted to be secured to the tractor frame side adjacent the lower end of said housing and sloping downwardly and outwardly from said housing lower end and having the upper end connected to the lower end portion of said housing for swinging movement about a horizontal axis in upwardly and downwardly directions, an upstanding frame positioned adjacent the lower end of said arm and connected intermediate its ends to the lower end of said arm for swinging movement about a second horizontal axis parallel to and spaced from said first named axis in upwardly and downwardly directions, an upstanding bracket arranged at a right angle with respect to said upstanding frame and connected to said frame for rotational movement about a vertical axis in clockwise and counterclockwise directions, an upstanding transmission casing arranged on the forward side of said arm and extending transversely of said bracket and connected to the lower end of said bracket for movement with the latter, a horizontally disposed reciprocating knife mower assembly projecting perpendicularly from and carried by said casing, a first means operatively connected to said arm adjacent its upper end for effecting the swinging movements of said arm, and a second means operatively connected to said upstanding frame adjacent the lower end thereof for effecting the swinging movements of said upstanding frame.

2. A power mover attachment comprising an upstanding housing adapted to be secured in side by side relation with respect to a side of a tractor frame, an arm arranged on the side of said housing remote from the side adapted to be secured to the tractor frame side adjacent the lower end of said housing and sloping downwardly and outwardly from said housing lower end and having the upper end connected to the lower end portion of said housing for swinging movement about a horizontal axis in upwardly and downwardly directions, an upstanding frame positioned adjacent the lower end of said arm and connected intermediate its ends to the lower end of said arm for swinging movement about a second horizontal axis parallel to and spaced from said first named axis in upwardly and downwardly directions, an upstanding bracket arranged at a right angle with respect to said upstanding frame and connected to said frame for rotational movement about a vertical axis in clockwise and counterclockwise directions, an upstanding transmission casing arranged on the forward side of said arm and extending transversely of said bracket and connected to the lower end of said bracket for movement with the latter, a horizontally disposed reciprocating knife mower assembly projecting perpendicularly from and carried by said casing, a first means operatively connected to said arm adjacent its upper end for effecting the swinging movements of said arm, a second means operatively connected to said frame adjacent the lower end thereof for effecting the swinging movements of said upstanding frame, and spring means operatively connected to said upstanding frame and bracket for urging said mower assembly toward its perpendicular position.

3. A power mower attachment comprising an upstanding housing adapted to be secured in side by side relation with respect to a side of a tractor frame, an arm arranged on the side of said housing remote from the side adapted to be secured to the tractor frame side adjacent the lower end of said housing and sloping downwardly and outwardly from said housing lower end and having the upper end connected to the lower end portion of said housing for swinging movement about a horizontal axis in upwardly and downwardly directions, an upstanding frame positioned adjacent the lower end of said arm and connected intermediate its ends to the lower end of said arm for swinging movement about a second horizontal axis parallel to and spaced from said first named axis in upwardly and downwardly directions, an upstanding bracket arranged at a right angle with respect to said upstanding frame and connected to said frame for rotational movement about a vertical axis in clockwise and counterclockwise directions, an upstanding transmission casing arranged on the forward side of said arm and extending transversely of said bracket and connected to the lower end of said bracket for tilting up and down movement about a third horizontal axis, cooperating means on said casing and said bracket for selectively holding said casing in any position of its tilting movements, a horizontally disposed reciprocating knife mower assembly projecting perpendicularly from and carried by said casing, a first means operatively connected to said arm adjacent its upper end for effecting the swinging movements of said arm, and a second means operatively connected to said upstanding frame adjacent the lower end thereof for effecting the swinging movements of said upstanding frame.

4. A power mower attachment comprising an upstanding housing adapted to be secured in side by side relation with respect to a side of a tractor frame, an arm arranged on the side of said housing remote from the side adapted to be secured to the tractor frame side adjacent the lower end of said housing and sloping downwardly and outwardly from said housing lower end and having the upper end connected to the lower end portion of said housing for swinging movement about a horizontal axis in upwardly and downwardly directions, an upstanding frame positioned adjacent the lower end of said arm and connected intermediate its ends to the lower end of said arm for swinging movement about a second horizontal axis parallel to and spaced from said first named axis in upwardly and downwardly directions, an upstanding bracket arranged at a right angle with respect to said upstanding frame and connected to said frame for rotational movement about a vertical axis in clockwise and counterclockwise directions, an upstanding transmission casing arranged on the forward side of said arm and extending transversely of said bracket and connected to the lower end of said bracket for movement with the latter, a horizontally disposed reciprocating knife mower assembly projecting perpendicularly from and carried by said casing, a first means operatively connected to said arm adjacent its upper end for effecting the swinging movements of said arm, a second means operatively connected to said upstanding frame adjacent the lower end thereof for effecting the swinging movements of said upstanding frame, and stop means operatively connected to said arm for limiting the extent of downward direction movement of said arm.

5. A power mower attachment comprising an upstanding housing adapted to be secured in side by side relation with respect to a side of a tractor frame, an arm arranged on the side of said housing remote from the side adapted to be secured to the tractor frame side adjacent the lower end of said housing and sloping downwardly and outwardly from said housing lower end and having the upper end connected to the lower end portion of said housing for swinging movement about a horizontal axis in upwardly and downwardly directions, an upstanding frame positioned adjacent the lower end of said arm and connected intermediate its ends to the lower end of said arm for swinging movement about a second horizontal axis parallel to and spaced from said first named axis in upwardly and downwardly directions, an upstanding bracket arranged at a right angle with respect to said upstanding frame and connected to said frame for rotational movement about a vertical axis in clockwise and counterclockwise directions, an upstanding transmission casing arranged on the forward side of said arm and extending transversely of said bracket and connected to the lower end of said bracket for movement with the latter, a horizontally disposed reciprocating knife mower assembly projecting perpendicularly from and carried by said casing, a first means operatively connected to said arm adjacent its upper end for effecting the swinging movements of said arm, a second means operatively connected to said upstanding frame adjacent the lower end thereof for effecting the swinging movements of said upstanding frame, spring means operatively connected to said vertical axis and said frame and bracket for urging said mower assembly toward its perpendicular position, and an abutment member on said bracket and engageable with said frame for limiting the rotational movement of said bracket in the counterclockwise direction.

6. A power mower attachment comprising an upstanding housing adapted to be secured in side by side relation with respect to a side of a tractor frame, an arm arranged on the side of said housing remote from the side adapted to be secured to the tractor frame side adjacent the lower end of said housing and sloping downwardly and outwardly from said housing lower end and having the upper end connected to the lower end portion of said housing for swinging movement about a horizontal axis in upwardly and downwardly directions, an upstanding frame positioned adjacent the lower end of said arm and connected intermediate its ends to the lower end of said arm for swinging movement about a second horizontal axis parallel to and spaced from said first named axis in upwardly and downwardly directions, an upstanding bracket arranged at a right angle with respect to said upstanding frame and connected to said frame for rotational movement about a vertical axis in clockwise and counterclockwise directions, an upstanding transmission casing arranged on the forward side of said arm and extending transversely of said bracket and connected to the lower end of said bracket for movement with the latter, a horizontally disposed reciprocating knife mower assembly projecting perpendicularly from and carried by said casing, a first fluid pressure means operatively connected to said arm adjacent its upper end for effecting the swinging movements of said arm, and a second fluid pressure means operatively connected to said upstanding frame adjacent the lower end thereof for effecting the swinging movements of said upstanding frame.

7. A power mower attachment comprising an upstanding housing adapted to be secured in side by side relation with respect to a side of a tractor frame, an arm arranged on the side of said housing remote from the side adapted to be secured to the tractor frame side adjacent the lower end of said housing and sloping downwardly and outwardly from said housing lower end and having the upper end connected to the lower end portion of said housing for swinging movement about a horizontal axis in upwardly and downwardly directions, an upstanding frame positioned adjacent the lower end of said arm and connected intermediate its ends to the lower end of said arm for swinging movement about a second horizontal axis parallel to and spaced from said first named axis in upwardly and downwardly directions, an upstanding bracket arranged at a right angle with respect to said upstanding frame and connected to said frame for rotational movement about a vertical axis in clockwise and counterclockwise directions, an upstanding transmission casing arranged on the forward side of said arm and extending transversely of said bracket and connected to the lower end of said bracket for movement with the latter, a horizontally disposed reciprocating knife mower assembly projecting perpendicularly from and carried by said casing, a first fluid pressure means operatively connected to said arm adjacent its upper end for effecting the swinging movements of said arm, and a second fluid pressure means operatively connected to said upstanding frame adjacent the lower end thereof for effecting the swinging movements of said upstanding frame, said first and second fluid pressure means being operable to effect the respective swinging movements of said arm and frame simultaneously.

8. A power mower attachment comprising an upstanding housing adapted to be secured in side by side relation with respect to a side of a tractor frame, an arm arranged on the side of said housing remote from the side adapted to be secured to the tractor frame side adjacent the lower end of said housing and sloping downwardly and outwardly from said housing lower end and having the upper end connected to the lower end portion of said housing for swinging movement about a horizontal axis in upwardly and downwardly directions, an upstanding frame positioned adjacent the lower end of said arm and connected intermediate its ends to the lower end of said arm for swinging movement about a second horizontal axis parallel to and spaced from said first named axis in upwardly and downwardly directions, an upstanding bracket ararnged at a right angle with respect to said upstanding frame and connected to said frame for rotational movement about a vertical axis in clockwise and counterclockwise directions, an upstanding transmission casing arranged on the forward side of said arm and extending transversely of said bracket and connected to the lower end of said bracket for movement with the latter, a horizontally disposed reciprocating knife mower assembly projecting perpendicularly from and carried by said casing, a first means operatively connected to said arm adjacent its upper end for effecting the swinging movements of said arm, a second means operatively connected to said upstanding frame adjacent the lower end thereof for effecting the swinging movements of said upstanding frame, and cooperating stop means on said housing and said arm for limiting the extent of the downwardly direction movement of said arm.

9. A power mower attachment comprising an upstanding housing adapted to be secured in side by side relation with respect to a side of a tractor frame, an arm arranged on the side of said housing remote from the side adapted to be secured to the tractor frame side adjacent the lower end of said housing and sloping downwardly and outwardly from said housing lower end and having the upper end connected to the lower end portion of said housing for swinging movement about a horizontal axis in upwardly and downwardly directions, an upstanding frame positioned adjacent the lower end of said arm and connected intermediate its ends to the lower end of said arm for swinging movement about a second horizontal axis parallel to and spaced from said first named axis in upwardly and downwardly directions, an upstanding bracket arranged at a right angle with respect to said upstanding frame and connected to said frame for rotational movement about a vertical axis in clockwise and counterclockwise directions, an upstanding transmission casing arranged on the forward side of said arm and extending transversely of said bracket and connected to the lower end of said bracket for movement with the latter, a horizontally disposed reciprocating knife mower assembly projecting perpendicularly from and carried by said casing, a first hydraulic cylinder including a reciprocating piston having one end of said piston operatively connected to said arm adjacent its upper end for effecting the swinging movements of said arm, a second hydraulic cylinder operatively connected to said upstanding frame adjacent the lower end thereof for effecting the swinging movements of said upstanding frame and a fluid pressure actuable element reciprocable in said piston of said first cylinder and movable into engagement with an end wall of said cylinder for limiting the extent of the downwardly direction movement of said arm.

10. A power mower attachment comprising an upstanding housing adapted to be secured in side by side relation with respect to a side of a tractor frame, an arm arranged on the side of said housing remote from the side adapted to be secured to the tractor frame side adjacent the lower end of said housing and sloping downwardly and outwardly from said housing lower end and having the upper end connected to the lower end portion of said housing for swinging movement about a horizontal axis in upwardly and downwardly directions, an upstanding frame positioned adjacent the lower end of said arm and connected intermediate its ends to the lower end of said arm for swinging movement about a second horizontal axis parallel to and spaced from said first named axis in upwardly and downwardly directions, an upstanding bracket arranged at a right angle with respect to said upstanding frame and connected to said frame for rotational movement about a vertical axis in clockwise and counterclockwise directions, an upstanding transmission casing arranged on the forward side of said arm and extending transversely of said bracket and connected to the lower end of said bracket for movement with the latter, a horizontally disposed reciprocating knife mower assembly projecting perpendicularly from and carried by said casing, a first means operatively connected to said arm adjacent its upper end for effecting the swinging movements of said arm, a second means operatively connected to said upstanding frame adjacent the lower end thereof for effecting the swinging movements of said upstanding frame, and stop means operatively connected to said frame for limiting the extent of the downward direction movement of said frame.

References Cited in the file of this patent

UNITED STATES PATENTS

| | | |
|---|---|---|
| 1,958,405 | Anthony et al. | May 15, 1934 |
| 2,236,598 | Haulzenroeder | Apr. 1, 1941 |
| 2,411,623 | Jaques | Nov. 26, 1946 |
| 2,422,044 | Ronning et al. | June 10, 1947 |
| 2,457,693 | Leicy | Dec. 28, 1948 |
| 2,603,930 | Holmes | July 22, 1952 |
| 2,663,133 | Davis | Dec. 22, 1953 |
| 2,663,134 | Bodine | Dec. 22, 1953 |